United States Patent [19]

Huang

[11] Patent Number: 4,989,729
[45] Date of Patent: Feb. 5, 1991

[54] AUTOMATIC RAPID HEATING CAN

[76] Inventor: Kin-Shen Huang, No. 116, Shuang-fu Village, Min-Hsiung Hsiang, Chia-I Hsien, Taiwan

[21] Appl. No.: 359,592

[22] Filed: Jun. 1, 1989

[51] Int. Cl.⁵ .............................................. B65B 25/22
[52] U.S. Cl. ................................... 206/222; 126/263; 62/4; 62/294
[58] Field of Search .............. 206/222; 126/263; 62/4, 62/294

[56] References Cited

U.S. PATENT DOCUMENTS

| | | | |
|---|---|---|---|
| 3,970,068 | 7/1976 | Sato | 206/222 |
| 4,221,291 | 9/1980 | Hunt | 206/222 |
| 4,524,078 | 6/1985 | Bardsley et al. | 206/222 |
| 4,648,532 | 3/1987 | Green | 206/222 |
| 4,785,931 | 11/1988 | Weir et al. | 206/222 |

Primary Examiner—Joseph Man-Fu Moy
Attorney, Agent, or Firm—Browdy and Neimark

[57] ABSTRACT

An automatic rapid heating can mainly characterizes that an elongated cylindrical sealed container is joined to the center of the inner rim of the bottom cover of the packing can and is also contained in the packing can; in said heating can where two kinds of separately isolated proper chemicals are stored, and a can opening device is joined to the outer rim of the bottom cover at the opposite position of said container, furthermore, a protective cover is sleeved on the bottom of the packing can on the outer side in order to safeguard the opening device free from collision. During using, the user has to employ the opening device to pierce through the bottom cover and the separation layer for the chemicals to make the two chemicals generate violent chemical reaction, so that the heat released is completely absorbed by the drink or beverage or food stored and packed in the can to make the beverage or food rapidly achieve the heating effects.

2 Claims, 1 Drawing Sheet

AUTOMATIC RAPID HEATING CAN

FIELD OF THE INVENTION

The present invention is related to an automatic rapid heating can, in particular, the self-prepared rapid heating device in the packing can for beverage and food in which during using, the user only needed to operate the opening device, thereby rapidly effecting heating of the beverage or food in the can.

BACKGROUND OF THE INVENTION

Presently, using packing cans as their containers for the beverage or foods is very popular, as they are quite convenient to use and easy to carry for field leisure activities. However, some food and beverages are not suitable for drinking or eating cold, especially normally heated beverages or food, such as coffee, tea or other foods, which must be hot to preserve their intended flavors; particularly during mountain climbing or cold time, the people badly need some hot drink or not food, but the usual packed cans can't serve such function.

OBJECTS OF THE INVENTION

The principal object of the present invention is to solve the above defect and to provide an automatic rapid heating device for packing cans, and its feature lies in that an elongated sealed container is provided at the center of the inner rim of the bottom cover of the packing can, and its outer rim can directly contact the beverage or food in the packing can. In the packing can two kinds of mutually separated chemicals are contained, whereby during using, the user employs the opening device provided on the outer rim of the bottom cover of the packing can to pierce through the bottom cover and the separation layer to make the two chemicals mix together, thereby producing a violent exothermic chemical reaction, so the heat will be completely absorbed by beverage or food to effect rapid heating of the food or beverage.

Besides, no matter when and where the users can immediately obtain hot drink or hot food to maintain the original flavor of drink or food and also can warm up the users' bodies and to maintain their bodies' warmth.

SUMMARY OF THE INVENTION

An automatic rapid heating can, which can be easy open can and also a common packing can, is mainly composed of an elongated sealed container joined to the inner rim of the bottom cover of the can. Two kinds of mutually separated chemicals are contained therein and, during using, the user employs the opening device provided on the outer rim of the bottom cover to pierce through the bottom cover and the separation layer in the said can to make the two chemicals mutually mix, thereby producing a violent exothermic chemical reaction which in turn releases a large amount of heat energy to be absorbed by the beverage or food in the can outside of the container, thereby making said beverage or food rapidly heated.

DETAILED DESCRIPTION

Figure 1:
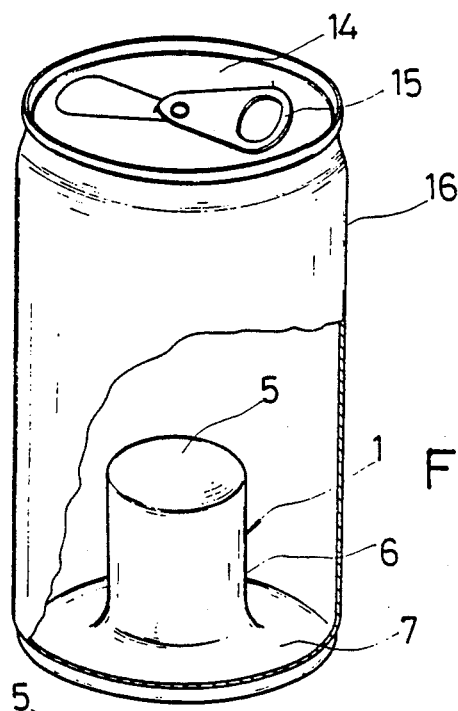
FIG. 1 is a partial cross section of the packing can showing the perspective view of the position and shape of the present invention.
Figure 2:
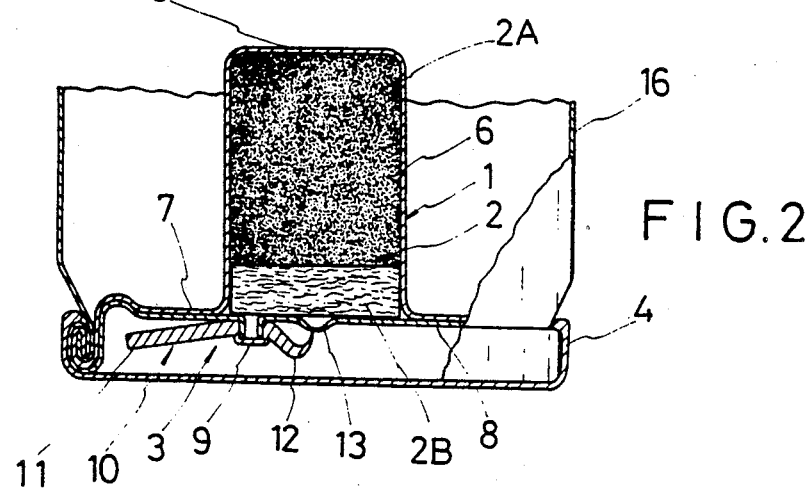
FIG. 2 is a cross section of the lower part of the device of FIG. 1 with the upper part omitted.
Figure 3:
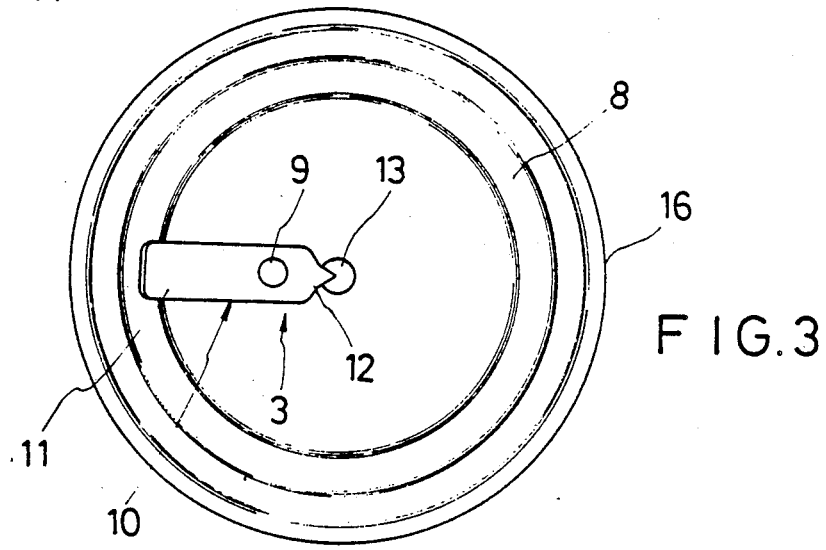
FIG. 3 is a bottom view of FIGS. 1 and 2 after the protective cover is removed.

Referring to the above drawings for exemplary embodiments, the present invention is composed of a container 1, chemicals 2 therein, an opening device 3 and a protective cover 4 which are joined in the packing can the container 1 is made of and punched of a better heat conductive metal and in a hollow elongated cylinder, its upper end rim 5 being sealed, while its lower end extends out of the joined plane 7 that is perpendicular to the cylindrical body 6 and also overlaps with the inner rim of the bottom cover 8 of the packing can 16 and is also jointly joined to the lower end of the packing can 16 to make the container 1 completely sealed in the center of the lower part and fully within the packing can 16. When the packing can 16 fully contains drink or food, the outer rim of the container 1 can directly contact the drink or food to facilitate the absorption of the heat thus produced in the container 1. Two kinds of proper chemicals 2A and 2B, for instance quick lime and water, are mutually separated and stored in the container 1, in which the quick lime 2A is a powder form and is contained in the upper part of the container 1, and water 2B is in a bag packed and sealed which is contained in the lower part of the container 1 and tightly adheres to the inner rim of the bottom cover 8. The outer rim of the said container 1 is joined with an opening device 3 which is formed so that the support post 9 protruding over the bottom cover 8 is joined to the opening tab 10, the rear end 11 of said opening tab 10 slightly raising outward to expedite the user's finger operation on it, while its front end 12 is a slightly inward bending tip head which directly aligns with the outward protruding small round dot or dimple 13 provided at the central position on the bottom cover 8. A protective cover 4 covers the outside part of the bottom cover 8 of the packing can 16 to protect the opening device free from collision and also to ensure collection of solution in the rim of the cover after the two chemicals are mixed; during using, the user turns the packing cam 16 upside down and the removes the protective cover 4, and his finger holds the rear end 11 of the opening tab 10 to make the opening tab 10 stand up, so that its front end 12 will pierce through the small round dot or dimple 13 and also extend into the container 1 to pierce through the water bag tightly adhering to the bottom cover 8, thereby making the water 2B and quick lime 2A mix to produce a violent chemical reaction which in turn release a large amount of heat to rapidly heated drink or food contained therein; rapidly heated, then the user can reapply the protective cover 4 and also turns over the packing can 16, and opens the pull ring 15 provided on its top cover 1 or uses other methods to open the top cover 14 to use the heated drink or food contained therein.

I claim:

1. In a packing can for providing heated food or beverage comprising an exterior side wall defining a food or beverage containing compartment, a bottom wall and an interior separating wall defining a container for chemicals which are capable of reacting to produce heat, and means for effecting mixing of said chemicals, the improvement wherein said separating wall comprises a cylindrical portion defining said container so that said container and said packing can are generally coaxial with said container projecting upwardly from and inside of said bottom wall of said packing can, said separating wall further extending outwardly perpendicular to the axis of said container and packing can adjacent said bottom wall, and joining means for joining said exterior side wall, said separating wall and said bottom wall in a seal at the lower outside portion of said packing can, and said means for effecting mixing comprising a lever having a handle and a pointed end, said lever being anchored intermediate said handle and said pointed end to said bottom wall by a post.

2. In a packing can for providing heated food or beverage comprising an exterior side wall defining a food or beverage containing compartment, a bottom wall and an interior separating wall defining a container for chemicals which are capable of reacting to produce heat, and means for effecting mixing of said chemicals, the improvement wherein said separating wall defines said container so that said container and said packing can are generally coaxial with said container projecting upwardly from and inside of said bottom wall of said packing can, said separating wall further extending outwardly perpendicular to the axis of said container and packing can adjacent the bottom wall of said packing can, and joining means for joining said exterior side wall, said separating wall and said bottom wall in a seal at the lower outside portion of said packing can, said means for effecting mixing comprising a lever having a handle and a pointed end, said lever being anchored intermediate said handle and said pointed end to said bottom wall by a post, said bottom wall comprising an outwardly domed dimple aligned with said pointed end of said mixing means, and said chemicals in said container comprising a bag of liquid adjacent and adhered to said bottom wall within said container.

* * * * *